(12) United States Patent
Lu et al.

(10) Patent No.: US 11,729,881 B2
(45) Date of Patent: Aug. 15, 2023

(54) LIGHTING DEVICE DRIVING CIRCUIT WITH HIGH OPERATING EFFICIENCY AND METHOD THEREOF

(71) Applicant: Xiamen PVTECH Co., Ltd., Fujian (CN)

(72) Inventors: Fuxing Lu, Fujian (CN); Zhirong Lin, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 13 days.

(21) Appl. No.: 17/668,399

(22) Filed: Feb. 10, 2022

(65) Prior Publication Data

US 2023/0189414 A1 Jun. 15, 2023

(30) Foreign Application Priority Data

Dec. 9, 2021 (CN) .......................... 202111497666.9

(51) Int. Cl.
*H05B 45/34* (2020.01)
*H05B 45/345* (2020.01)
*H05B 45/37* (2020.01)

(52) U.S. Cl.
CPC ............. *H05B 45/34* (2020.01); *H05B 45/37* (2020.01)

(58) Field of Classification Search
CPC ................................ H05B 45/34; H05B 45/37
See application file for complete search history.

(56) References Cited

U.S. PATENT DOCUMENTS 10,674,585 B1 * 6/2020 Liu ...................... H05B 45/395
2013/0293139 A1 * 11/2013 Sadwick ................ H05B 45/28
315/224

* cited by examiner

*Primary Examiner* — Minh D A
(74) *Attorney, Agent, or Firm* — Winston Hsu (57) ABSTRACT

A lighting device driving circuit with high operating efficiency is provided, which includes a rectifying module, a constant-voltage module, an input signal collecting module, a constant-voltage signal collecting module and a constant-voltage control module. The rectifying module receives a power signal from a power source input terminal to generate a rectified voltage signal. The constant-voltage module receives the rectified voltage signal to generate a constant-voltage signal. The input signal collecting module receives the power signal or the rectified voltage signal to generate a first feedback signal. The constant-voltage signal collecting module receives the first feedback signal and the constant-voltage signal to generate a second feedback signal. The constant-voltage control module generates a control signal according to the second feedback signal so as to control the constant-voltage module to adjust the constant-voltage signal and drive a load.

6 Claims, 5 Drawing Sheets

LIGHTING DEVICE DRIVING CIRCUIT WITH HIGH OPERATING EFFICIENCY AND METHOD THEREOF

BACKGROUND OF THE INVENTION

1. Field of the Invention

The present invention relates to a lighting device driving circuit, in particular to a lighting device driving circuit with high operating efficiency. The present invention further relates to the control method of the lighting device driving circuit.

2. Description of the Prior Art

Different countries may adopt different voltage standards. Therefore, currently available lighting device driving circuit needs to have a universal voltage circuit design. Currently, the most frequently-used driving circuit structure is the circuit structure including a constant-voltage circuit and a voltage reduction circuit with a view to prevent lighting devices from flickering. When a high input voltage or a low input voltage is inputted to this circuit structure, the constant-voltage circuit thereof should boost the input voltage to a certain voltage value, such as 400V or 450V. However, when the input voltage is low, the constant-voltage circuit would be burdened with high step-up ratio, which significantly decreases the operating efficiency thereof. The difference between the operating efficiency of this circuit structure operating in the high input voltage and the operating efficiency of this circuit structure operating in the low input voltage may be up to 3%. Accordingly, it is obvious that this circuit structure is not suitable for some countries adopting low voltage standards (e.g., 110V).

SUMMARY OF THE INVENTION

The present invention is related to a lighting device driving circuit with high operating efficiency. In one embodiment of the present invention, the lighting device driving circuit includes a rectifying module, a constant-voltage module, an input signal collecting module, a constant-voltage signal collecting module and a constant-voltage control module. The rectifying module receives a power signal from a power source input terminal to generate a rectified voltage signal. The constant-voltage module receives the rectified voltage signal to generate a constant-voltage signal. The input signal collecting module receives the power signal or the rectified voltage signal to generate a first feedback signal. The constant-voltage signal collecting module receives the first feedback signal and the constant-voltage signal to generate a second feedback signal. The constant-voltage control module generates a control signal according to the second feedback signal so as to control the constant-voltage module to adjust the constant-voltage signal and drive a load.

In one embodiment, the second feedback signal is the integrated signal of the first feedback signal and the constant-voltage signal.

In one embodiment, the lighting device further includes a voltage reduction module. The voltage reduction module receives the constant-voltage signal to generate a driving signal in order to drive the load.

In one embodiment, the load is a light-emitting diode lamp or other similar elements.

In one embodiment, the rectifying module is a bridge rectifier or other similar elements.

The present invention is related to a method for improving an operating efficiency of a lighting device driving circuit. In one embodiment of the present invention, the method includes the following steps: receiving a power signal from a power source input terminal by a rectifying module to generate a rectified voltage signal; receiving the rectified voltage signal by a constant-voltage module to generate a constant-voltage signal; receiving the power signal or the rectified voltage signal by an input signal collecting module to generate a first feedback signal; receiving the first feedback signal and the constant-voltage signal by a constant-voltage signal collecting module to generate a second feedback signal; and generating a control signal according to the second feedback signal by a constant-voltage control module so as to control the constant-voltage module to adjust the constant-voltage signal and drive a load.

In one embodiment, the step of receiving the first feedback signal and the constant-voltage signal by the constant-voltage signal collecting module to generate the second feedback signal further includes the following step: integrating the first feedback signal with the constant-voltage signal by the constant-voltage signal collecting module to generate the second feedback signal.

In one embodiment, the method further includes the following step: receiving the constant-voltage signal by a voltage reduction module to generate a driving signal in order to drive the load.

In one embodiment, the load is a light-emitting diode lamp or other similar elements.

In one embodiment, the rectifying module is a bridge rectifier or other similar elements.

The lighting device driving circuit with high operating efficiency and the method thereof in accordance with the embodiments of the present invention may have the following advantages:

(1) In one embodiment of the present invention, the input signal collecting module of the lighting device driving circuit with high operating efficiency can receive a power signal or a rectified voltage signal to generate a first feedback signal and the constant-voltage signal collecting module thereof can receive the first feedback signal and a constant-voltage signal to generate a second feedback signal. Then, the constant-voltage control module of the lighting device driving circuit can control the constant-voltage module thereof to adjust the constant-voltage signal according to the second feedback signal. The above mechanism can enhance the voltage following effect of the lighting device driving circuit, so the operating efficiency thereof can be significantly increased.

(2) In one embodiment of the present invention, the lighting device driving circuit with high operating efficiency can enhance the voltage following effect thereof via a special circuit design and a great operating mechanism so as to improve the operating efficiency thereof. Therefore, the operating efficiency of the lighting device driving circuit operating in the high input voltage can be close to that of the lighting device driving circuit operating in the low input voltage. As a result, the lighting device driving circuit can satisfy the requirements of different countries, which can be more comprehensive in application.

(3) In one embodiment of the present invention, the lighting device driving circuit can effectively improve the operating efficiency thereof and can be applied to various types of lighting devices. Thus, the lighting device driving circuit can be more flexible in application and can conform to actual needs.

(4) In one embodiment of the present invention, the circuit design of the lighting device driving circuit is simple and can achieve high performance, so the lighting device driving circuit can achieve the desired technical effects without significantly increasing the cost thereof. Therefore, the lighting device driving circuit can have high commercial value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 1:
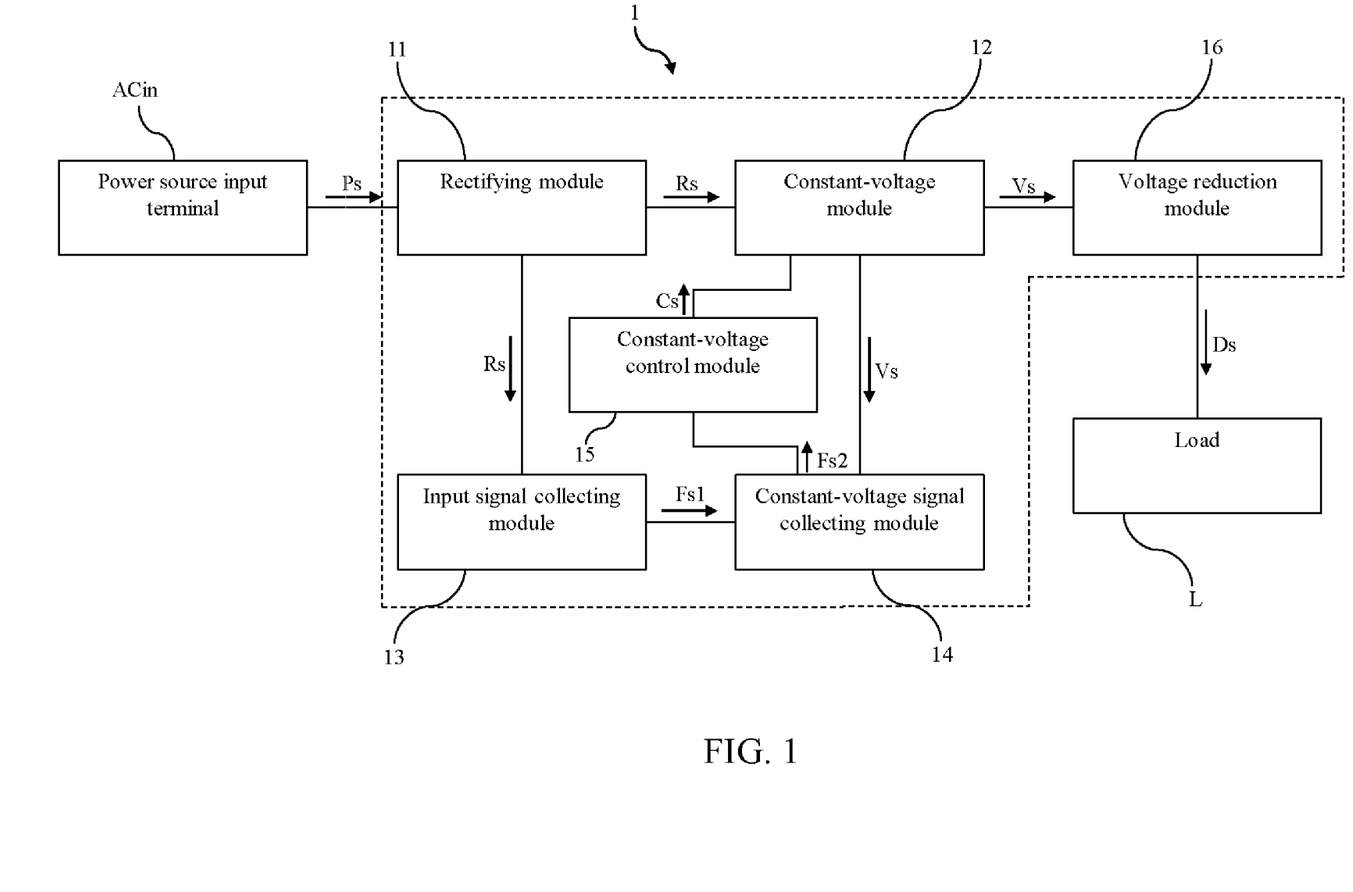
FIG. 1 is a circuit diagram of a lighting device driving circuit with high operating efficiency in accordance with a first embodiment of the present invention.

Please refer to FIG. 1, which is a circuit diagram of a lighting device driving circuit with high operating efficiency in accordance with a first embodiment of the present invention. As shown in FIG. 1, the lighting device driving circuit 1 with high operating efficiency includes a rectifying module 11, a constant-voltage module 12, an input signal collecting module 13, a constant-voltage signal collecting module 14, a constant-voltage control module 15 and a voltage reduction module 16.

The rectifying module 11 receives a power signal Ps from a power source input terminal ACin to generate a rectified voltage signal Rs. In one embodiment, the rectifying module 11 may be, but not limited to, a bridge rectifier. In another embodiment, the rectifying module 11 may be other similar circuits having the rectifying function.

The constant-voltage module 12 receives the rectified voltage signal Rs to generate a constant-voltage signal Vs. In one embodiment, the constant-voltage module 12 may be a constant-voltage circuit or other similar circuits.

The voltage reduction module 16 receives the constant-voltage signal Vs to generate a driving signal Ds in order to drive a load L. In one embodiment, the voltage reduction module 16 may be, but not limited to, a buck converter. In another embodiment, the voltage reduction module 16 may be other similar circuits.

In addition, the input signal collecting module 13 receives the rectified voltage signal Rs to generate a first feedback signal Fs1.

The constant-voltage collecting module 14 receives the first feedback signal Fs1 and the constant-voltage signal Vs to generate a second feedback signal Fs2. In this embodiment, the constant-voltage collecting module 14 may integrate the first feedback signal Fs1 with the constant-voltage signal Vs to generate an integrated signal. The integrated signal can serve as the second feedback signal Fs2.

Afterward, the constant-voltage control module 15 generates a control signal Cs according to the second feedback signal Fs2 with a view to control the constant-voltage module 12 to adjust the constant-voltage signal Vs. Then, the voltage reduction module 16 receives the adjusted constant-voltage signal Vs to generate the driving signal Ds so as to drive the load L.

Via the above mechanism, the second feedback signal Fs2 can simultaneously have the characteristics of the rectified voltage signal Rs outputted by the rectifying module 11 and the constant-voltage signal Vs outputted by the constant-voltage module 12 in order to effectively enhance the voltage following effect of the lighting device driving circuit 1. In this way, the operating efficiency of the lighting device driving circuit 1 can be dramatically optimized.

Besides, the lighting device driving circuit 1 of this embodiment can satisfy the requirements of different countries and can be applied to various types of lighting devices. Thus, the lighting device driving circuit 1 not only can be more comprehensive in application, but also can conform to actual needs.

The embodiment just exemplifies the present invention and is not intended to limit the scope of the present invention; any equivalent modification and variation according to the spirit of the present invention is to be also included within the scope of the following claims and their equivalents.

Figure 2:
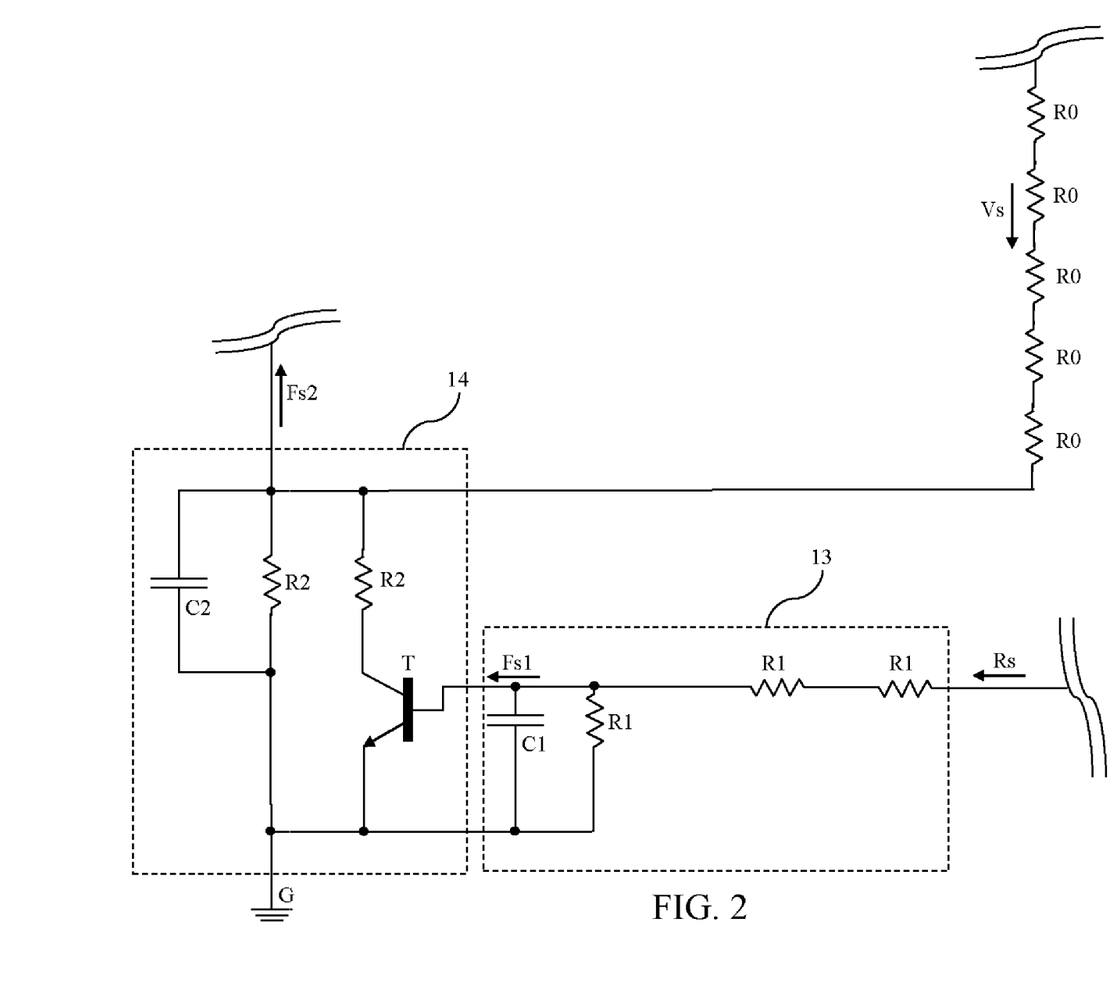
FIG. 2 is a circuit diagram of an input signal collecting module and a constant-voltage signal collecting module of the lighting device driving circuit with high operating efficiency in accordance with the first embodiment of the present invention.

Please refer to FIG. 2, which is a circuit diagram of the input signal collecting module and the constant-voltage signal collecting module of the lighting device driving circuit with high operating efficiency in accordance with the first embodiment of the present invention. FIG. 2 illustrates one of the circuit designs of the input signal collecting module 13 and the constant-voltage signal collecting module 14. As shown in FIG. 2, the input signal collecting module 13 includes a plurality of resistors R1 and a capacitor C1. The constant-voltage signal collecting module 14 includes a plurality of resistors R2, a transistor T1 and a capacitor C2.

The constant-voltage signal collecting module 14 is connected to a plurality of resistors R0 (G stands for the ground point)

The input signal collecting module 13 performs voltage dividing for the rectified voltage signal Rs to generate the first feedback signal Fs1 in order to control the transistor T1. When the base voltage of the transistor T1 is 0~V1, the transistor T1 is in off state. When the base voltage of the transistor T1 is V1~V2, the transistor T1 can be considered a variable resistor. When the base voltage of the transistor T1 is greater than V2, the transistor T1 is in on state (V2>V1>0).

When the base voltage of the transistor T1 is 0~V1 (off state), the signal received by the constant-voltage signal collecting module 14 is the divided voltage signal caused by the resistors R0 and the resistors R2. When the base voltage of the transistor T1 is V1~V2, the signal received by the constant-voltage signal collecting module 14 is the divided voltage signal caused by the resistors R0, the resistors R2 and the transistor T1 (one of the resistors R2 is connected to the transistor T1 in series and the two elements are connected to the other of the resistors R2 in parallel). When the base voltage of the transistor T1 is greater than V2 (on state), the signal received by the constant-voltage signal collecting module 14 is the divided voltage signal caused by the resistors R0 and the resistors R2 connected to each other in parallel.

Therefore, the constant-voltage collecting module 14 can generate the second feedback signal Fs2 simultaneously having the characteristics of the constant-voltage signal Vs and the rectified voltage signal Rs.

The input signal collecting module 13 and the constant-voltage signal collecting module 14 can also be realized by other circuit designs.

The embodiment just exemplifies the present invention and is not intended to limit the scope of the present invention; any equivalent modification and variation according to the spirit of the present invention is to be also included within the scope of the following claims and their equivalents.

Figure 3:
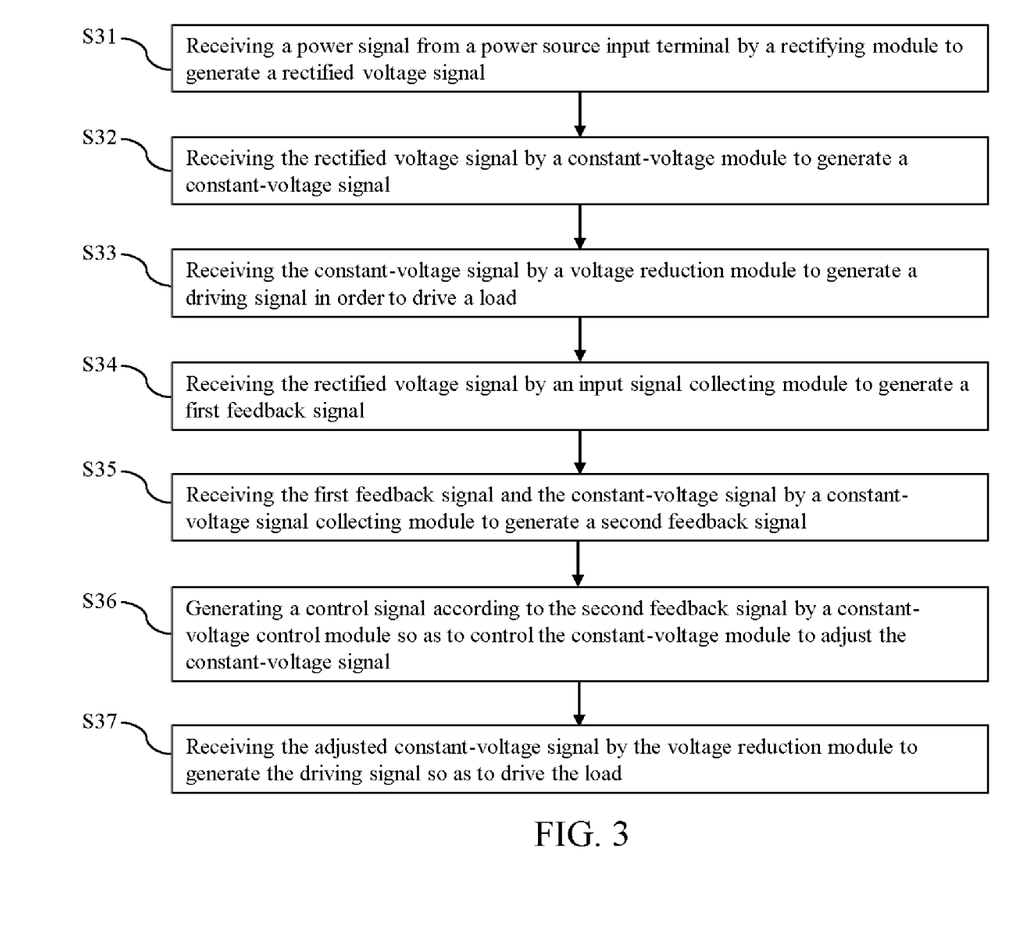
FIG. 3 is a flow chart of a method for improving the operating efficiency of the lighting device driving circuit in accordance with the first embodiment of the present invention.

Please refer to FIG. 3, which is a flow chart of a method for improving the operating efficiency of the lighting device driving circuit in accordance with the first embodiment of the present invention. The method for improving the operating efficiency of the lighting device driving circuit of the embodiment includes the following steps:

Step S31: receiving a power signal from a power source input terminal by a rectifying module to generate a rectified voltage signal.

Step S32: receiving the rectified voltage signal by a constant-voltage module to generate a constant-voltage signal.

Step S33: receiving the constant-voltage signal by a voltage reduction module to generate a driving signal in order to drive a load.

Step S34: receiving the rectified voltage signal by an input signal collecting module to generate a first feedback signal.

Step S35: receiving the first feedback signal and the constant-voltage signal by a constant-voltage signal collecting module to generate a second feedback signal.

Step S36: generating a control signal according to the second feedback signal by a constant-voltage control module so as to control the constant-voltage module to adjust the constant-voltage signal.

Step S37: receiving the adjusted constant-voltage signal by the voltage reduction module to generate the driving signal so as to drive the load.

The embodiment just exemplifies the present invention and is not intended to limit the scope of the present invention; any equivalent modification and variation according to the spirit of the present invention is to be also included within the scope of the following claims and their equivalents.

It is worthy to point out that the difference between the operating efficiency of a currently available driving circuit structure operating in the high input voltage and the operating efficiency of this driving circuit structure operating in the low input voltage may be up to 3%, which significantly decreases the operating efficiency of this driving circuit structure. On the contrary, according to one embodiment of the present invention, the input signal collecting module of the lighting device driving circuit with high operating efficiency can receive a power signal or a rectified voltage signal to generate a first feedback signal and the constant-voltage signal collecting module thereof can receive the first feedback signal and a constant-voltage signal to generate a second feedback signal. Then, the constant-voltage control module of the lighting device driving circuit can control the constant-voltage module thereof to adjust the constant-voltage signal according to the second feedback signal. The above mechanism can enhance the voltage following effect of the lighting device driving circuit, so the operating efficiency thereof can be significantly increased.

Further, according to one embodiment of the present invention, the lighting device driving circuit with high operating efficiency can enhance the voltage following effect thereof via a special circuit design and a great operating mechanism so as to improve the operating efficiency thereof. Therefore, the operating efficiency of the lighting device driving circuit operating in the high input voltage can be close to that of the lighting device driving circuit operating in the low input voltage. As a result, the lighting device driving circuit can satisfy the requirements of different countries, which can be more comprehensive in application.

Moreover, according to one embodiment of the present invention, the lighting device driving circuit can effectively improve the operating efficiency thereof and can be applied to various types of lighting devices. Thus, the lighting device driving circuit can be more flexible in application and can conform to actual needs.

Furthermore, according to one embodiment of the present invention, the circuit design of the lighting device driving circuit is simple and can achieve high performance, so the lighting device driving circuit can achieve the desired technical effects without significantly increasing the cost thereof. Therefore, the lighting device driving circuit can have high commercial value. As described above, the lighting device driving circuit according to the embodiments of the present invention can really achieve great technical effects.

Figure 4:
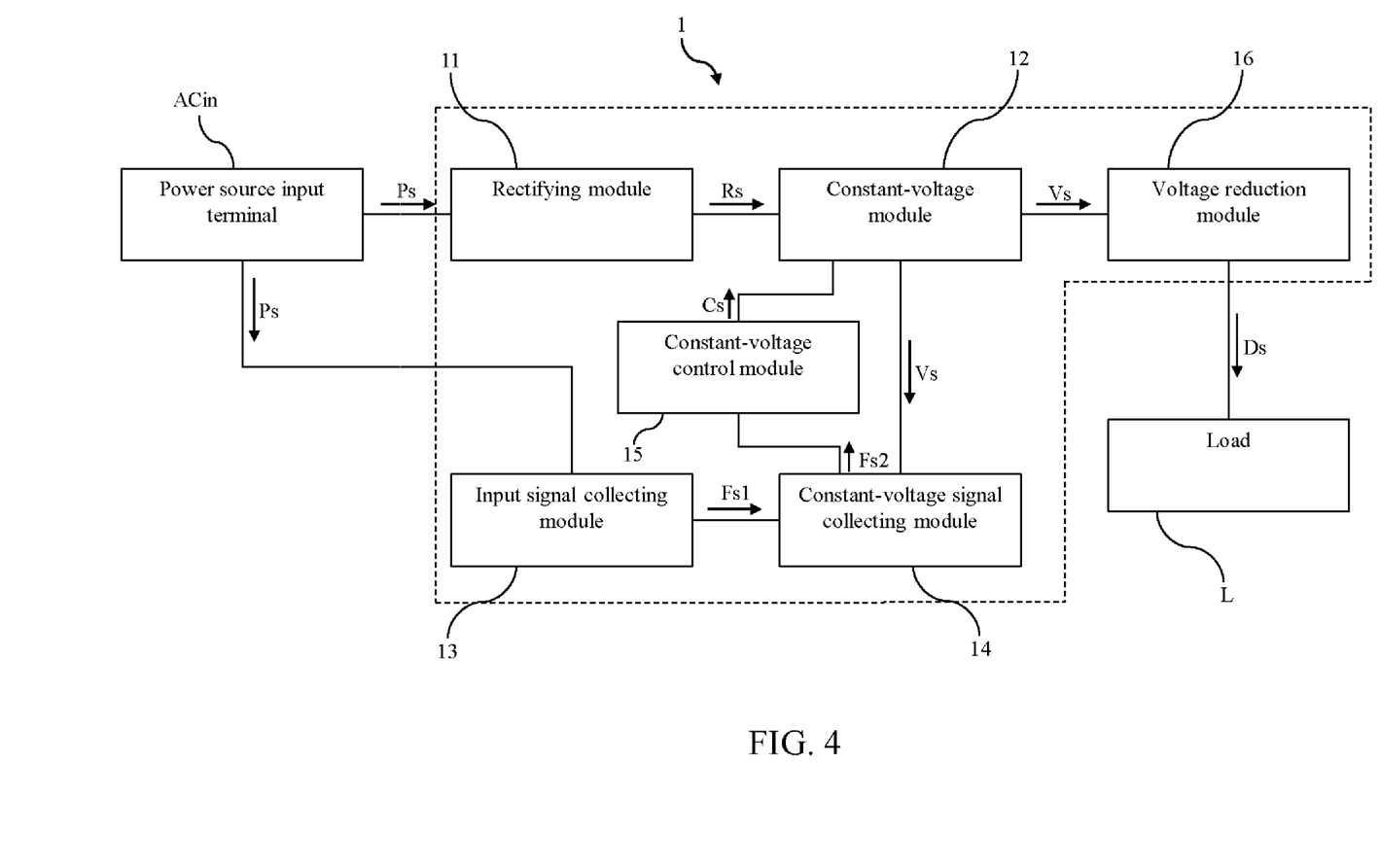
FIG. 4 is a circuit diagram of a lighting device driving circuit with high operating efficiency in accordance with a second embodiment of the present invention.

Please refer to FIG. 4, which is a circuit diagram of a lighting device driving circuit with high operating efficiency in accordance with a second embodiment of the present invention. As shown in FIG. 4, the lighting device driving circuit 1 with high operating efficiency includes a rectifying module 11, a constant-voltage module 12, an input signal collecting module 13, a constant-voltage signal collecting module 14, a constant-voltage control module 15 and a voltage reduction module 16.

The rectifying module 11 receives a power signal Ps from a power source input terminal ACin to generate a rectified voltage signal Rs. The constant-voltage module 12 receives the rectified voltage signal Rs to generate a constant-voltage signal Vs. The voltage reduction module 16 receives the constant-voltage signal Vs to generate a driving signal Ds in order to drive a load L.

The difference between this embodiment and the previous embodiment is that the input signal collecting module 13 receives the power signal Ps to generate a first feedback signal Fs1, and then the constant-voltage signal collecting module 14 receives the first feedback signal Fs1 and the constant-voltage signal Vs to generate a second feedback signal Fs2. In this way, the constant-voltage signal collecting module 14 can integrate the first feedback signal Fs1 and the constant-voltage signal Vs to generate an integrated signal, which can serve as the second feedback signal Fs2. Afterward, the constant-voltage control module 15 can generate a control signal Cs according to the second feedback signal Fs2 in order to control the constant-voltage module 12 to adjust the constant-voltage signal Vs. Finally, the voltage reduction module 16 receives the adjusted constant-voltage signal Vs to generate the driving signal Ds so as to drive the load L.

Via the above mechanism, the second feedback signal Fs2 can simultaneously have the characteristics of the power signal Ps outputted by the power source input terminal ACin and the constant-voltage signal Vs outputted by the constant-voltage module 12, which can effectively enhance the voltage following effect of the lighting device driving circuit 1. Accordingly, the operating efficiency of the lighting device driving circuit 1 can be greatly improved.

The embodiment just exemplifies the present invention and is not intended to limit the scope of the present invention; any equivalent modification and variation according to the spirit of the present invention is to be also included within the scope of the following claims and their equivalents.

Figure 5:
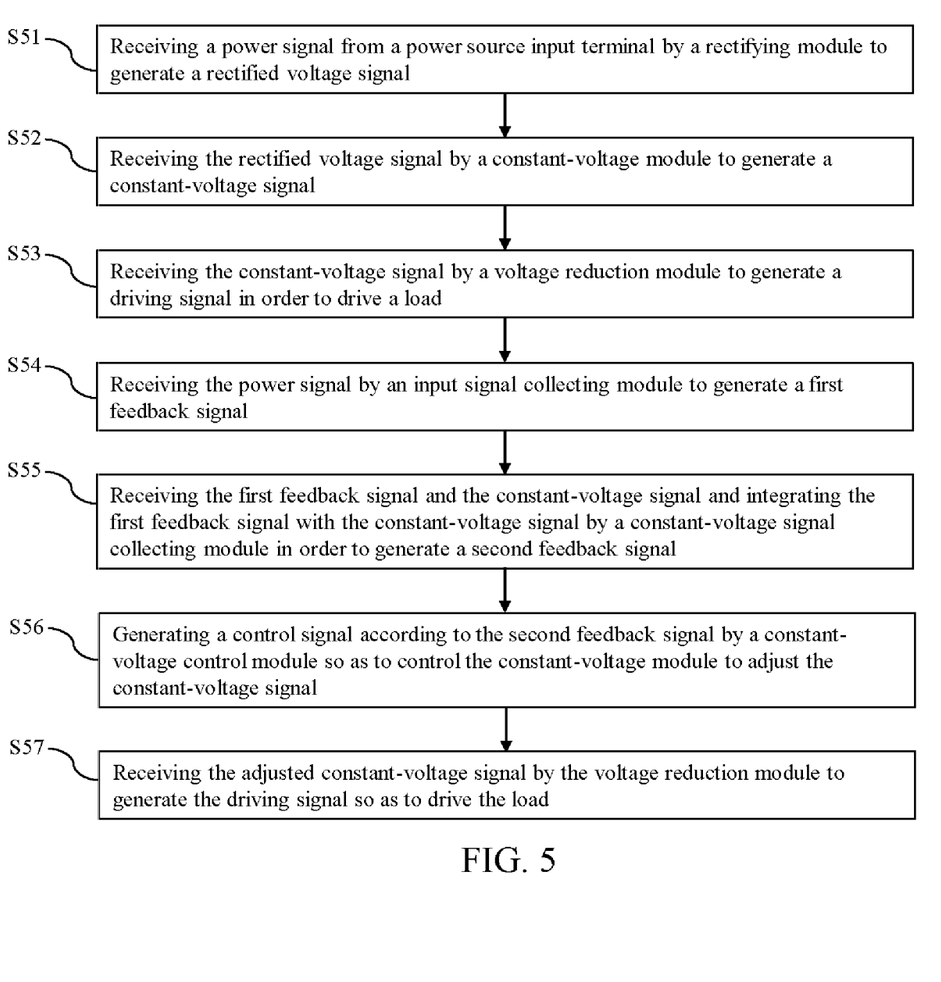
FIG. 5 is a flow chart of a method for improving the operating efficiency of the lighting device driving circuit in accordance with the second embodiment of the present invention.

Please refer to FIG. 5, which is a flow chart of a method for improving the operating efficiency of the lighting device driving circuit in accordance with the second embodiment of the present invention. The method for improving the operating efficiency of the lighting device driving circuit of the embodiment includes the following steps:

Step S51: receiving a power signal from a power source input terminal by a rectifying module to generate a rectified voltage signal.

Step S52: receiving the rectified voltage signal by a constant-voltage module to generate a constant-voltage signal.

Step S53: receiving the constant-voltage signal by a voltage reduction module to generate a driving signal in order to drive a load.

Step S54: receiving the power signal by an input signal collecting module to generate a first feedback signal.

Step S55: receiving the first feedback signal and the constant-voltage signal and integrating the first feedback signal with the constant-voltage signal by a constant-voltage signal collecting module in order to generate a second feedback signal.

Step S56: generating a control signal according to the second feedback signal by a constant-voltage control module so as to control the constant-voltage module to adjust the constant-voltage signal.

Step S57: receiving the adjusted constant-voltage signal by the voltage reduction module to generate the driving signal so as to drive the load.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the input signal collecting module of the lighting device driving circuit with high operating efficiency can receive a power signal or a rectified voltage signal to generate a first feedback signal and the constant-voltage signal collecting module thereof can receive the first feedback signal and a constant-voltage signal to generate a second feedback signal. Then, the constant-voltage control module of the lighting device driving circuit can control the constant-voltage module thereof to adjust the constant-voltage signal according to the second feedback signal. The above mechanism can enhance the voltage following effect of the lighting device driving circuit, so the operating efficiency thereof can be significantly increased.

Further, according to one embodiment of the present invention, the lighting device driving circuit with high operating efficiency can enhance the voltage following effect thereof via a special circuit design and a great operating mechanism so as to improve the operating efficiency thereof. Therefore, the operating efficiency of the lighting device driving circuit operating in the high input voltage can be close to that of the lighting device driving circuit operating in the low input voltage. As a result, the lighting device driving circuit can satisfy the requirements of different countries, which can be more comprehensive in application.

Moreover, according to one embodiment of the present invention, the lighting device driving circuit can effectively improve the operating efficiency thereof and can be applied to various types of lighting devices. Thus, the lighting device driving circuit can be more flexible in application and can conform to actual needs.

Furthermore, according to one embodiment of the present invention, the circuit design of the lighting device driving circuit is simple and can achieve high performance, so the lighting device driving circuit can achieve the desired technical effects without significantly increasing the cost thereof. Therefore, the lighting device driving circuit can have high commercial value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device driving circuit with high operating efficiency, comprising:
   a rectifying module, configured to receive a power signal from a power source input terminal to generate a rectified voltage signal;
   a constant-voltage module, configured to receive the rectified voltage signal to generate a constant-voltage signal;
   an input signal collecting module, configured to receive the power signal or the rectified voltage signal to generate a first feedback signal; and a constant-voltage signal collecting module, configured to receive the first feedback signal and the constant-voltage signal to generate a second feedback signal, wherein the second feedback signal is an integrated signal of the first feedback signal and the constant-voltage signal;

a constant-voltage control module, configured to generate a control signal according to the second feedback signal so as to control the constant-voltage module to adjust the constant-voltage signal; and a voltage reduction module, configured to receive the constant-voltage signal to generate a driving signal in order to drive a load.

2. The lighting device driving circuit with high operating efficiency as claimed in claim 1, wherein the load is a light-emitting diode lamp.

3. The lighting device driving circuit with high operating efficiency as claimed in claim 1, wherein the rectifying module is a bridge rectifier.

4. A method for improving an operating efficiency of a lighting device driving circuit, comprising:

receiving a power signal from a power source input terminal by a rectifying module to generate a rectified voltage signal;

receiving the rectified voltage signal by a constant-voltage module to generate a constant-voltage signal;

receiving the power signal or the rectified voltage signal by an input signal collecting module to generate a first feedback signal;

receiving the first feedback signal and the constant-voltage signal, and integrating the first feedback signal with the constant-voltage signal by a constant-voltage signal collecting module to generate a second feedback signal; and generating a control signal according to the second feedback signal by a constant-voltage control module so as to control the constant-voltage module to adjust the constant-voltage signal; and receiving the constant-voltage signal by a voltage reduction module to generate a driving signal in order to drive the load.

5. The method for improving the operating efficiency of the lighting device driving circuit as claimed in claim 4, wherein the load is a light-emitting diode lamp.

6. The method for improving the operating efficiency of the lighting device driving circuit as claimed in claim 4, wherein the rectifying module is a bridge rectifier.

* * * * *